United States Patent Office 2,958,671
Patented Nov. 1, 1960

2,958,671

COMPOSITIONS OF POLYMERIC ALKENYL AROMATIC HYDROCARBONS AND MONOVINYL AROMATIC HYDROCARBON-BUTADIENE COPOLYMERS

Henno Keskkula and Raymond M. Price, Midland, and Arthur F. Roche, Freeland, Mich., assignors to The Dow Chemical Company, Midland, Mich., a corporation of Delaware No Drawing. Filed Oct. 4, 1954, Ser. No. 460,264

8 Claims. (Cl. 260—45.5)

This invention concerns moldable compositions of matter which are mixtures of resinous polymeric alkenyl aromatic hydrocarbons and monovinyl aromatic hydrocarbon-butadiene copolymers.

Polystyrene is a widely used thermoplastic resin. It is a clear, colorless, transparent resin possessing good dielectric properties, tensile strength and dimensional stability to heat. These properties render it useful for a variety of applications. However, polystyrene is subject to the disadvantage that it is exceedingly deficient in impact resistance.

It has been proposed to incorporate or blend various synthetic copolymers of styrene and a conjugated diolefin, e.g. butadiene-1,3, with polystyrene. It has been proposed to blend polystyrene with rubbery copolymers of styrene and butadiene, and resinous copolymers of styrene and butadiene. However, such compositions heretofore proposed do not have the elongation and high impact strength required for articles subject to severe service conditions.

It has now been found that resinous compositions which can readily be shaped by usual compression or injection molding operations, or by extrusion methods, to form tough plastic articles having high impact resistance and good elongation are readily obtained by incorporating or blending a copolymer of butadiene-1,3 and a monovinyl aromatic hydrocarbon such as styrene, or vinyltoluene, with a normally solid homopolymer or copolymer of one or more alkenyl aromatic hydrocarbons, e.g. polystyrene, or a copolymer of styrene and alpha-methylstyrene, as hereinafter defined.

According to the invention the moldable compositions are mixtures of from 55 to 70 percent by weight of a resinous homopolymer, or copolymer, of one or more alkenyl aromatic hydrocarbons and from 45 to 30, preferably from 40 to 35, percent of a copolymer containing in chemically combined form from 42 to 50 percent by weight of butadiene-1,3 and from 58 to 50 percent of styrene, or vinyltoluene, in which mixtures the polymerized alkenyl aromatic hydrocarbon resin is uniformly and intimately combined with the copolymer of the monovinyl aromatic hydrocarbon and butadiene.

The alkenyl aromatic resins to be employed in preparing the new compositions are normally solid relatively brittle polymers of one or more monovinyl aromatic hydrocarbons of the benzene series having the vinyl radical directly attached to a carbon atom of the aromatic nucleus, such as styrene, vinyltoluene, vinylxylene, ethylvinylbenzene, ethylvinyltoluene, isopropylvinylbenzene, or diethylvinylbenzene. Copolymers of any one or more of such monovinyl aromatic hydrocarbons with 40 percent by weight or less, preferably from 15 to 40 percent, of an alkenyl aromatic hydrocarbon of the benzene series such as alpha-methylstyrene or para-methyl-alpha-methylstyrene, i.e. an isopropenyl aromatic hydrocarbon, can also be used. The preferred alkenyl aromatic resins are polystyrene, polyvinyltoluene, copolymers of styrene and vinyltoluene, and copolymers of from 60 to 85 percent by weight of styrene and from 40 to 15 percent of alpha-methylstyrene.

The alkenyl aromatic resins have a molecular weight of at least 30,000 or greater, preferably a molecular weight between 50,000 and 200,000, as determined by the well known Staudinger viscosity method.

The alkenyl aromatic resin is employed in proportions corresponding to from 55 to 7, preferably from 60 to 65, percent by weight of the sum of the polymeric components of the composition.

The copolymer of butadiene-1,3 and styrene, or vinyltoluene, starting material can be a copolymer containing in chemically combined form from 42 to 50, preferably from 43 to 48, percent by weight of butadiene-1,3 and from 58 to 50, preferably from 57 to 52, percent of styrene, or vinyltoluene, or a mixture of styrene and vinyltoluene, which copolymer swells appreciably in toluene to form an apparent solution comprising a swollen flowable gel. The butadiene copolymer preferably has a gel content between 70 and 95 percent by weight of the copolymer. The gel content of the butadiene copolymer can readily be controlled by the temperature at which the monomeric materials are copolymerized, the extent of the polymerization, i.e. the percent conversion, or by the addition of mercaptan modifiers to the reaction, although employment of the latter usually results in the formation of a copolymer of lower gel content than is desired.

The gel content of the copolymer is readily determined by placing a weighted portion of the copolymer in toluene at 25° C. and allowing the material to stand in darkness without agitating for a period of 48 hours to dissolve the soluble portion of the copolymer, then separating the insoluble material from the solution by filtering, drying the insoluble material and weighing the latter. The insoluble material represents the gel content of the copolymer.

The copolymers of styrene or vinyltoluene and butadiene-1,3 can be prepared in usual ways, e.g. by polymerizing a mixture of the monomers in admixture with an aqueous solution containing from 1 to 10 percent by weight of an emulsifying agent at temperatures between 50° and 100° C., or at a lower temperature and in the presence of a polymerization catalyst such as benzoyl peroxide, hydrogen peroxide, sodium persulfate, or potassium persulfate, to obtain an aqueous colloidal dispersion of the copolymer. The butadiene copolymers can be prepared by procedure similar to that described in United States Patent No. 2,498,712. A suitable procedure for making the copolymers is to place about 50 parts by weight of a mixture of butadiene-1,3 and styrene, or vinyltoluene, together with about 50 parts of an aqueous solution consisting of approximately 99.62 percent by weight of water, 0.16 percent of potassium persulfate, 0.13 percent of Aquarex D (i.e. the monosodium sulfate esters of a mixture of higher fatty alcohols, principally lauryl and myristic alcohols) and 0.09 percent of sodium bicarbonate, in a closed vessel and under a pressure sufficient to liquefy the monomers. The mixture is agitated to effect emulsification and then heated with continued agitation at temperatures between 50° and 80° C. until the decrease in vapor pressure of the mixture, resulting principally from consumption of the butadiene-1,3 in the polymerization reaction is complete or nearly complete. After completing the reaction the vessel and its contents are cooled, the pressure released and the aqueous colloidal dispersion of the copolymer is removed.

Aqueous colloidal dispersions of copolymers of butadiene-1,3 and styrene, or vinyltoluene, may contain from 25 to 50 percent by weight of the copolymer in the form of a synthetic latex. The copolymer usually has a gel content corresponding to from 70 to 95 percent by weight of the copolymer when the polymerization is carried out at temperatures between 50 and 80° C. and in the absence of polymerization modifying agents to control or regulate the molecular weight of the polymer being formed. The preparation of the butadiene copolymers is usually carried out by polymerizing a mixture of the monomeric materials in an aqueous solution containing an emulsifying agent and a suitable catalyst in the absence of an added polymerization regulator or modifying agent, e.g. dodecyl mercaptan, for controlling the molecular weight of the copolymer. The employment of a modifying agent, e.g. dodecyl mercaptan or tertiary dodecyl mercaptan, in the polymerization usually results in the formation of a butadiene copolymer that is less suitable for making the new compositions of the invention than is desired.

The copolymer can be recovered from the synthetic latex, or aqueous colloidal dispersion, by coagulation of the latter and separating, washing and drying the copolymer, or by drying the latex, e.g. by spray drying or by casting a film or layer of the latex on a continuous belt or rotating drum where it is heated to evaporate the water. The copolymer is usually recovered by drying the latex since the latter method is more conveniently employed to obtain the copolymer in a form, e.g. as powder, granules, or shreds, most suitable for incorporating the same with the alkenyl aromatic resin.

Small amounts of additional ingredients may be added to the aqueous dispersion of the copolymer of butadiene-1,3 and styrene, or vinyltoluene, before recovering the copolymer therefrom. Among such additive agents there may be mentioned softeners, flow agents, or plasticizers, such as polyethylene glycols having an average molecular weight between 400 and 800, or soyabean oil, butyl stearate, or pigments, fillers, colors, stabilizing agents, or antioxidants. In adding such materials the addition of solids in dispersion and the addition of liquids in solution or emulsion is preferred. When the inclusion of such added agents is desired in the finished composition, they can advantageously be incorporated with the aqueous dispersion of the butadiene copolymer prior to drying the latter to recover the copolymer. An antioxidant, e.g. hydroquinone, 2,6-di-tertiary-butyl-4-methyl phenol, or 4-tertiary-butyl catechol, is usually added to the aqueous colloidal dispersion of the butadiene copolymer prior to coagulating or drying the same to recover the copolymer.

The compositions are prepared by mechanically working the polymeric ingredients in admixture with one another until a homogeneous or substantially homogeneous composition is obtained. The alkenyl aromatic resin and the rubbery copolymer can be mechanically worked in admixture with one another on compounding rolls, in a Banbury mixer, or a plastics extruder, and at temperatures between 90° and 240° C.

The compositions thus obtained are uniform or substantially uniform materials in which the alkenyl aromatic resin and the butadiene copolymer, e.g. a copolymer of styrene and butadiene-1,3 are physically combined with one another in such manner that no observable separation of the components occurs either upon heating the compositions to a fusion temperature or above, or upon cooling of the same to a temperature of −20° C. or below. The new compositions possess high impact strength, together with good tensile strength, elongation and dimensional stability to heat. The compositions are useful for the manufacture of molded plastic articles suitable for a variety of applications.

In practice, the alkenyl aromatic resin is usually heat-plastified on compounding rolls or in a Banbury mixer, after which the butadiene copolymer is added in the desired proportion. The mixture is mechanically worked with a shearing, tearing, or compounding action to intimately disperse the resin and the copolymer with one another and form a homogeneous, or substantially homogeneous, composition. Such mixing or blending together of the polymeric ingredients can also be carried out by feeding the ingredients into a plastics extruder in the desired proportions wherein they are heat-plastified and mechanically worked into a uniform or substantially uniform mass of material. The compositions are usually cut or ground to a granular form suitable for molding.

The following examples illustrate ways in which the principle of the invention has been applied, but are not to be construed as limiting its scope.

EXAMPLE 1

In each of a series of experiments, a charge of a resinous copolymer of 75 percent by weight of styrene and 25 percent of alpha-methylstyrene, in amount as stated in the following table, was placed in a Banbury mixer and heat-plastified. Thereafter, a charge of a copolymer of approximately 45 percent by weight of butadiene-1,3 and 55 percent of styrene containing one percent by weight of polyethylene glycol having an average molecular weight of 600, one percent of butyl stearate and two percent of 2,6-di-tertiary-butyl-4-methyl phenol, as lubricant, plasticizer and antioxidant, respectively, was added. The mixture was compounded in the Banbury mixer at temperatures between 180° and 190° C. for a period of 6 minutes, then removed and cut into small pieces and allowed to cool. After cooling, the pieces of the composion were ground to smaller granules suitable for molding. Portions of the composition were injection molded to form test bars of ⅛ x ½ inch cross section by 4 inches long. These test pieces were used to determine the tensile strength and percent elongation values for the composition employing procedures similar to those described in ASTM D638–49T. The impact strength for the composition was determined employing procedure similar to that described in ASTM D256–47T. Other molded test pieces of the composition were used to determine a heat distortion temperature by a procedure of Heirholzer and Boyer, see ASTM Bulletin No. 134 of May 1945. Rockwell hardness for the composition was determined by procedure similar to that described in ASTM D785–48T, employing a ¼-inch diameter steel ball and a minor loading of 3 kilograms and a major loading of 15 kilograms. Table I identifies the composition by giving the proportions of the copolymer of styrene and alpha-methyl-styrene and the copolymer of butadiene-1,3 and styrene employed in preparing the same. The table also gives the properties of the compositions. For purpose of comparison, compositions of the copolymer of styrene and alpha-methyl-styrene and the copolymer of butadiene and styrene in proportions outside the scope of the invention were prepared and tested by similar procedures, and are included in the table.

Table I

| Run No. | Starting Materials | | Properties of Product | | | | |
|---|---|---|---|---|---|---|---|
| | Copolymer of Alpha-methyl Styrene[2] and Styrene Percent | Copolymer of Butadiene[1] and Styrene[2] Percent | Tensile Strength, lbs./sq. in. | Elongation Percent | Rockwell Hardness | Notched Impact Strength, Ft.-lbs. | Heat Distortion Temp., °C. |
| 1 | 75 | 25 | 4,580 | 23 | 115-167 | 1.4 | 88 |
| 2 | 70 | 30 | 3,870 | 26 | 101-155 | 5.2 | 83 |
| 3 | 65 | 35 | 3,100 | 26 | 83-141 | 7.2 | 81 |
| 4 | 60 | 40 | 3,040 | 37.6 | 52-114 | 9.2 | 85 |
| 5 | 57 | 43 | 2,700 | 43.3 | 35-100 | 10.7 | 82 |
| 6 | 53 | 47 | 2,300 | 49.3 | -1-72 | 10.8 | 80 |

[1] The butadiene copolymer contained one percent by weight of polyethylene glycol, one percent of butyl stearate and two percent of 2,6-di-tert.-butyl-4-methylphenol.

EXAMPLE 2

A charge of 184.5 grams of a solid copolymer of 25 percent by weight of alpha-methylstyrene and 75 percent of styrene was heat-plastified by milling the same on compounding rolls heated at a temperature of about 340° F. A charge of 115.5 grams of a copolymer of 55 percent by weight of vinyltoluene and 45 percent of butadiene-1,3 containing 2 percent by weight of 2,6-di-tertiarybutyl-4-methylphenol, 1 percent of polyethylene glycol having an average molecular weight of 600 and 1 percent of butyl stearate, was added. The mixture was compounded on the heated rolls for 15 minutes to uniformly incorporate the ingredients with one another and form a homogeneous composition. The composition was removed from the rolls, cooled and cut to a granular form suitable for molding. The copolymer of butadiene-1,3 and vinyltoluene employed in the experiment was prepared by placing 50 parts by weight of a mixture of 45 percent by weight of butadiene-1,3 and 55 percent of vinyltoluene, together with 50 parts of an aqueous solution containing 99.62 percent of water, 0.16 percent of potassium persulfate, 0.13 percent of Aquarex D (the monosodium sulfate esters of a mixture of higher fatty alcohols, principally lauryl and myristic alcohols) and 0.09 percent of sodium bicarbonate, in a closed vessel. The mixture was agitated to effect emulsification, then heated with continued agitation at a temperature of about 70° C. for 16 hours to polymerize the monomers and obtain an aqueous colloidal dispersion or synthetic latex of the copolymer. The latex was removed from the vessel. A weighed portion of the latex was evaporated to dryness and the dried solids re-weighed to determine the percent of copolymer in the latex. An aqueous emulsion containing 2 percent by weight of 2,6-di-tertiary-butyl-4-methylphenol, 1 percent of polyethylene glycol having an average molecular weight of 600, and 1 percent of butyl stearate, based on the weight of the copolymer, was added to the aqueous colloidal dispersion of the copolymer, with stirring. The copolymer was recovered by evaporating the water from a layer of the aqueous dispersion on rolls internally heated at a temperature of 150° C. and scraping the dried copolymer from the rolls in the form of shreds or flakes. The gel content or percent gel value for the rubbery copolymer was determined by dispersing a weighed portion, in this case 0.20 gram, of the rubbery copolymer in the form of small pieces about one millimeter thick in 100 cc. of toluene at room temperature and allowing the mixture to stand in the dark without agitating for a period of 48 hours. Thereafter, the mixture was filtered through a 250 mesh per inch metal wire U.S. standard screen. The residue was washed with 25 cc. of toluene, then dried and weighed. The weight of the dried toluene-insoluble material divided by the original weight of the test portion of the copolymer multiplied by 100 equals the percent gel value for the copolymer. The copolymer of 45 percent by weight of butadiene-1,3 and 55 percent of vinyltoluene was found to have a gel content of 87.1 percent. The butadiene copolymer was incorporated with the heat-plastified copolymer of styrene and alpha-methylstyrene on compounding rolls as previously described to obtain a homogeneous composition. The properties of the composition were determined by procedures employed in Example 1. The composition had the properties:

Tensile strength, lbs./sq. in. _____ 2560
Elongation, percent _____ 34.2
Notched impact strength, ft.-lbs _____ 9.2
Heat distortion temperature, °C _____ 85
Rockwell hardness _____ 70-129

EXAMPLE 3

A charge of 210 grams of a copolymer of 25 percent by weight of alpha-methylstyrene and 75 percent of styrene was heat-plastified on compounding rolls and mixed with 90 grams of a copolymer of 50 percent by weight of butadiene-1,3 and 50 percent of vinyltoluene prepared by procedure described in the preceding example. The composition had the properties:

Tensile strength, lbs./sq. in. _____ 3220
Elongation, percent _____ 34.6
Notched impact strength, ft.-lbs _____ 5.8
Heat distortion temperature, °C _____ 82
Rockwell hardness _____ 98-151

EXAMPLE 4

In each of a series of experiments, a charge of 210 grams of a batch of a copolymer of approximately 25 percent by weight of alpha-methylstyrene and 75 percent of styrene was heat-plastified by milling the same on a pair of compounding rolls each of 3 inches diameter by 8 inches long. The rolls were internally heated with steam at a temperature of about 340° F. After heat-plastifying the copolymer of styrene and alpha-methylstyrene on the rolls, there was added 90 grams of a copolymer containing in chemically combined form styrene and butadiene in proportions as stated in the following table, together with 2 percent by weight of 2,6-di-tertiary-butyl-4-methylphenol, 1 percent of polyethylene glycol and 1 percent of butyl stearate, based on the weight of the butadiene copolymer. The resulting mixture was compounded on the heated rolls for a period of about 15 minutes to uniformly mix the ingredients with one another, after which the composition was removed and allowed to cool. The composition was ground to a granular form suitable for molding. The copolymers of butadiene-1,3 and styrene employed in the experiments were prepared by polymerizing a mixture of the monomers in aqueous emulsion at a temperature of 70° C. employing a procedure similar to that described in Example 2. The properties for the composition were determined by procedures employed in Example 1. Table II identifies the compositions by giving the proportions of the copolymer of styrene and alpha-methylstyrene and the copolymer of butadiene and styrene in percent by weight employed in preparing the same. The table also gives the proportions in percent by weight of styrene and butadiene employed in preparing the rubbery copolymer and the gel content in percent by weight of the copolymer. The table gives the properties determined for the compositions. For purpose of comprison, a similar composition prepared from a copolymer of 40 percent by weight of butadiene and 60 percent of styrene made under similar polymerization conditions and compounded with a portion of the batch of the copolymer of styrene and alpha-methylstyrene in similar manner as herein described to obtain a uniform composition containing 30 percent by weight of the butadiene copolymer, is included in the table.

copolymer of styrene and alpha-methylstyrene in similar manner as herein described to obtain a uniform composition containing 38.5 percent by weight of the butadiene copolymer, is included in the table.

*Table III*

| Run No. | Starting Materials | | | | Properties of Product | | | | |
|---|---|---|---|---|---|---|---|---|---|
| | Styrene/Alpha-Methyl Styrene Copolymer, 75/25 Ratio, Percent | Butadiene/Styrene Copolymer | | | Tensile Strength, lbs./sq. in. | Elongation, Percent | Notched Impact Strength, ft.-lbs. | Heat Distortion Temp., °C. | Rockwell Hardness |
| | | Percent | Butadiene/Styrene Ratio | Percent gel | | | | | |
| 1 | 61.5 | 38.5 | 40/60 | 89.2 | 3,040 | 22.2 | 8.2 | 84 | 80-140 |
| 2 | 61.5 | 38.5 | 42/58 | 87.5 | 2,950 | 19.9 | 10.9 | 83 | 82-141 |
| 3 | 61.5 | 38.5 | 45/55 | 88.5 | 2,820 | 38.4 | 9.2 | 86 | 72-129 |
| 4 | 61.5 | 38.5 | 50/50 | 86.7 | 2,470 | 28.7 | 9.5 | 83 | 80-148 |

EXAMPLE 6

In each of a series of experiments, a composition was prepared by heat-plastifying a portion of a batch of a resinous copolymer of 75 percent by weight of styrene and 25 percent of alpha-methylstyrene on compounding rolls and milling the same with a copolymer of butadiene and styrene in proportions as stated in the following

*Table II*

| Run No. | Starting Materials | | | | Properties of Product | | | | |
|---|---|---|---|---|---|---|---|---|---|
| | Styrene/Alpha-Methyl Styrene Copolymer, 75/25 Ratio, Percent | Butadiene/Styrene Copolymer | | | Tensile Strength, lbs./sq. in. | Elongation, Percent | Notched Impact Strength, ft.-lbs. | Heat Distortion Temp., °C. | Rockwell Hardness |
| | | Percent | Butadiene/Styrene Ratio | Percent gel | | | | | |
| 1 | 70 | 30 | 40/60 | 89.2 | 4,100 | 16.7 | 0.5 | 84 | 105-159 |
| 2 | 70 | 30 | 42/58 | 87.5 | 3,890 | 16.5 | 3.2 | 85 | 111-162 |
| 3 | 70 | 30 | 45/55 | 88.6 | 3,790 | 29.1 | 2.6 | 82 | 104-155 |
| 4 | 70 | 30 | 50/50 | 86.7 | 3,240 | 30.6 | 3.2 | 89 | 112-162 |

EXAMPLE 5

In each of a series of experiments a charge of 184.5 grams of a copolymer of 75 percent by weight of styrene and 25 percent of alpha-methylstyrene was heat-plastified on compounding rolls and was milled with 115.5 grams of a copolymer containing in chemically combined form styrene and butadiene in proportions as stated in the following table, together with 2 percent by weight of 2,6-di-tertiary-butyl-4-methylphenol, 1 percent of polyethylene glycol having an average molecular weight of 600 and 1 percent of butyl stearate, based on the weight of the butadiene copolymer. The mixture was milled on the rolls for about 15 minutes to obtain a uniform composition, after which it was removed and allowed to cool. Molded pieces of the composition were prepared and tested employing procedures employed in Example 1. Table III identifies the composition and gives the proportion in percent by weight of the copolymer of styrene and alpha-methylstyrene and the copolymer of styrene and butadiene employed in preparing the same. The table also gives the ratio of butadiene to styrene in the butadiene copolymer starting material and the percent by weight of gel in the copolymer. The table gives the properties of the compositions. For purpose of comparison, a similar composition prepared from a butadiene copolymer containing in chemically combined form 40 percent by weight of butadiene-1,3, and 60 percent of styrene, made under similar polymerization conditions and compounded with portions of the same batch of the table. The copolymers of butadiene and styrene employed in the experiments were prepared by placing about 50 parts by weight of a mixture of butadiene and styrene as stated in the table, together with 50 parts of an aqueous solution of 99.62 percent by weight of water, 0.16 percent of potassium persulfate, 0.13 percent of Aquarex D, and 0.09 percent of sodium carbonate, with or without 0.25 percent by weight of tert.-dodecyl mercaptan, based on the weight of the monomers, as polymerization modifying agent to regulate the gel content of the copolymer, in a closed vessel, agitating the mixture to effect emulsification and heating the mixture at a temperature of 70° C. to polymerize the monomers. The aqueous colloidal dispersion of the copolymer was removed from the polymerization vessel and 2 percent by weight of 2,6-di-tertiary-butyl-4-methylphenol, 1 percent of polyethylene glycol having an average molecular weight of 600 and 1 percent of butyl stearate, based on the weight of the copolymer, in aqueous emulsion added with stirring. The resulting aqueous emulsion was spread as a layer on heated rolls and dried to recover the copolymer. Molded test pieces of each composition were tested employing procedures employed in Example 1. Table IV identifies the compositions by giving the proportions of the copolymer of styrene and alpha-methylstyrene and the copolymer of butadiene and styrene employed in preparing the same. The table also gives the proportions of butadiene and styrene in percent by weight in the butadiene copolymer and the percent by weight of gel in the copolymer. The table gives the properties of the compositions.

Table IV

| Run No. | Starting Materials | | | | Properties of Product | | | | |
|---|---|---|---|---|---|---|---|---|---|
| | Styrene/Alpha-Methyl Styrene Copolymer, 75/25 Ratio, Percent | Butadiene/Styrene Copolymer | | | Tensile Strength, lbs./sq. in. | Elongation, Percent | Notched Impact Strength, ft.-lbs. | Heat Distortion Temp., ° C. | Rockwell Hardness |
| | | Percent | Butadiene/Styrene Ratio | Percent gel | | | | | |
| 1 | 70 | 30 | 45/55 | 83.2 | 4,400 | 21.2 | 3.4 | 80 | 102–156 |
| 2 | 70 | 30 | 50/50 | 83.7 | 4,160 | 23.9 | 5.6 | 82 | 118–158 |
| 3 | 61.5 | 38.5 | 45/55 | 83.2 | 3,330 | 33.1 | 10.0 | 84 | 68–130 |
| 4 | 61.5 | 38.5 | 50/50 | 83.7 | 3,230 | 38.9 | 9.5 | 87 | 78–138 |
| 5 | 70 | 30 | ¹45/55 | 65.0 | 3,200 | 19.7 | 0.7 | 83 | 89–149 |
| 6 | 70 | 30 | ¹50/50 | 61.1 | 4,220 | 11.5 | 2.5 | 83 | 91–148 |
| 7 | 61.5 | 38.5 | ¹45/55 | 65.0 | 3,200 | 19.7 | 2.5 | 78 | 31–105 |
| 8 | 61.5 | 38.5 | ¹50/50 | 61.1 | 2,800 | 10.6 | 3.8 | 78 | 15–94 |

¹ The butadiene/styrene copolymers were prepared in the presence of 0.25 percent by weight of tert.-dodecyl mercaptan as modifying agent, based on the weight of the monomers.

EXAMPLE 7

In each of a series of experiments, a resinous copolymer of 75 percent by weight of styrene and 25 percent of alpha-methylstyrene was heat-plastified on compounding rolls and milled with a copolymer of butadiene and styrene in proportions as stated in the following table. The copolymers of butadiene-1,3 and styrene employed in the experiments were prepared by polymerizing a mixture of the monomers in proportions as stated in the following table in an aqueous emulsion at a temperature of 50° C. by procedure similar to that described in Example 2. The butadiene copolymer contained two percent by weight of 2,6-di-tertriary-butyl-4-methylphenol, one percent of polyethylene glycol having an average molecular weight of 600 and one percent of butyl stearate, which additives are mixed with the latex prior to drying the same to recover the copolymer. Molded test bars of the composition were used to determine the properties employing procedures employed in Example 1. Table V identifies the compositions and gives their properties.

hours, then cooled. The vessel was opened and 2.5 parts of hydroquinone, dispersed in an aqueous solution of 150 parts of water and 10 parts of sodium lauryl sulfate, was mixed with the aqueous colloidal solution of the copolymer. The butadiene copolymer was recovered by coagulating the aqueous solution, separating the copolymer and washing the same with water, then with ethyl alcohol. The copolymer was dried in a vacuum oven at a temperature of 27° C. at an absolute pressure of about 10 millimeters. The composition was cut to a granular form. Molded portions of the composition were tested employing procedures as employed in Example 1. The composition had the properties:

Tensile strength, lbs./sq. in. _____ 4270
Elongation, percent _____ 39.5
Notched impact strength, ft.-lbs. _____ 6.3

A similar composition was prepared by compounding 165 grams of polystyrene and 135 grams of the butadiene Table V

| Run No. | Starting Materials | | | | Properties of Product | | | | |
|---|---|---|---|---|---|---|---|---|---|
| | Styrene/Alpha-Methyl Styrene Copolymer, 75/25 Ratio, Percent | Butadiene/Styrene Copolymer | | | Tensile Strength, lbs./sq. in. | Elongation, Percent | Notched Impact Strength, ft.-lbs. | Heat Distortion Temp., ° C | Rockwell Hardness |
| | | Percent | Butadiene/Styrene Ratio | Percent gel | | | | | |
| 1 | 70 | 30 | 43/57 | 87.3 | 4,320 | 16.4 | 3.9 | 84 | 99–154 |
| 2 | 61.5 | 38.5 | 43/57 | 87.3 | 3,070 | 16.1 | 13.7 | 78 | 65–128 |
| 3 | 70 | 30 | 46/54 | 92.4 | 3,780 | 30.0 | 7.3 | 85 | 101–153 |
| 4 | 61.5 | 38.5 | 46/54 | 92.4 | 2,960 | 21.8 | 13.2 | 80 | 62–130 |

EXAMPLE 8

A charge of 210 grams of molding grade polystyrene was heat-plastified by milling the same on a pair of 3-inch diameter by 8 inches long internally heated laboratory rolls. One of the rolls was heated at a temperature of about 280° F. and the other was heated at a temperature of about 240° F. A charge of 90 grams of a copolymer of 50 percent by weight of butadiene and 50 percent of styrene was added. The resulting mixture was compounded on the heated rolls for a period of about 15 minutes to intimately mix the polymeric ingredients with one another, then was removed and allowed to cool to room temperature. The butadiene copolymer employed in the experiment was prepared by placing 40 parts by weight of butadiene and 40 parts of styrene, together with 344 parts of an aqueous solution containing 4 parts of sodium lauryl sulfate, 0.24 part of potassium persulfate and 1 part of sodium bicarbonate, in a closed vessel. The mixture was agitated to effect emulsification and was heated at a temperature of 60° C. for a period of 19 copolymer on the rolls as described above. The composition had the properties:

Tensile strength, lbs./sq. in. _____ 2960
Elongation, percent _____ 36.9
Notched impact strength, ft.-lbs. _____ 9.9

Materials made in accordance with the present invention with the butadiene copolymer prepared by polymerizing a mixture of butadiene-1,3 and styrene or vinyltoluene in the aforementioned proportions in an aqueous emulsion in the absence or substantial absence of a polymerization modifying agent and at temperatures between 50° and 100° C., and which butadiene copolymer has a gel content between 70 and 95 percent by weight of the copolymer, exhibit good tensile strength and elongation values, high impact strength and dimensional stability to heat and possess good hardness. Compositions possessing thee properties are highly desired for the manufacture of molded plastic articles subject to severe service conditions. The invention provides a low cost, tough, plastic material of excellent impact resistance and suitable for use in a variety of applications.

We claim:

1. A composition of matter comprising from 55 to 70 percent by weight of at least one thermoplastic polymer which is a member of the group consisting of polymerized monovinyl aromatic hydrocarbons of the benzene series having the vinyl radical directly attached to a carbon atom of the aromatic nucleus and copolymers of at least 60 percent by weight of at least one such monovinyl aromatic hydrocarbon and not more than 40 percent by weight of an alkenyl aromatic hydrocarbon selected from the group consisting of alpha-methylstyrene and para-methyl-alpha-methylstyrene, and from 45 to 30 percent by weight of a copolymer containing in chemically combined form from 42 to 50 percent by weight of butadiene-1,3 and from 58 to 50 percent by weight of a monovinyl aromatic hydrocarbon selected from the group consisting of styrene and vinyltoluene, said butadiene copolymer having a gel content between 70 and 95 percent by weight of the copolymer as determined in toluene at 25° C.

2. A composition of matter comprising from 55 to 70 percent by weight of a thermoplastic polymer of at least one monovinyl aromatic hydrocarbon of the benzene series having the vinyl radical directly attached to a carbon atom of the aromatic nucleus and from 45 to 30 percent by weight of a copolymer containing in chemically combined form from 42 to 50 percent by weight of butadiene-1,3 and from 58 to 50 percent by weight of a monovinyl aromatic hydrocarbon selected from the group consisting of styrene and vinyltoluene, said butadiene copolymer having a gel content between 70 and 95 percent by weight of the copolymer as determined in toluene at 25° C.

3. A composition of matter comprising from 55 to 70 percent by weight of a thermoplastic copolymer of from 60 to 85 percent by weight of at least one monovinyl aromatic hydrocarbon of the benzene series having the vinyl radical directly attached to a carbon atom of the aromatic nucleus and from 40 to 15 percent by weight of alpha-methylstyrene and from 45 to 30 percent by weight of a copolymer containing in chemically combined form from 42 to 50 percent by weight of butadiene-1,3 and from 58 to 50 percent by weight of a monovinyl aromatic hydrocarbon selected from the group consisting of styrene and vinyltoluene, said butadiene copolymer having a gel content between 70 and 95 percent by weight of the copolymer as determined in toluene at 25° C.

4. A composition of matter comprising from 55 to 70 percent by weight of polystyrene and from 45 to 30 percent by weight of a rubbery copolymer containing in chemically combined form from 42 to 50 percent by weight of butadiene-1,3 and from 58 to 50 percent by weight of a monovinyl aromatic hydrocarbon selected from the group consisting of styrene and vinyltoluene, said butadiene copolymer having a gel content between 70 and 95 percent by weight of the copolymer as determined in toluene at 25° C.

5. A composition of matter comprising from 55 to 70 percent by weight of a copolymer of from 60 to 85 percent by weight of styrene and from 40 to 15 percent by weight of alpha-methylstyrene and from 45 to 30 percent by weight of a rubbery copolymer containing in chemically combined form from 42 to 50 percent by weight of butadiene-1,3 and from 58 to 50 percent by weight of a monovinyl aromatic hydrocarbon selected from the group consisting of styrene and vinyltoluene, said butadiene copolymer having a gel content between 70 and 95 percent by weight of the copolymer as determined in toluene at 25° C.

6. A composition of matter comprising from 55 to 70 percent by weight of polystyrene and from 45 to 30 percent by weight of a rubbery copolymer containing in chemically combined form from 42 to 50 percent by weight of butadiene-1,3 and from 58 to 50 percent by weight of styrene, said butadiene copolymer having a gel content between 70 and 95 percent by weight of the copolymer as determined in toluene at 25° C.

7. A composition of matter comprising from 55 to 70 percent by weight of a copolymer of from 60 to 85 percent by weight of styrene and from 40 to 15 percent by weight of alpha-methylstyrene and from 45 to 30 percent by weight of a copolymer containing in chemically combined form from 42 to 50 percent by weight of butadiene-1,3 and from 58 to 50 percent by weight of styrene, said butadiene copolymer having a gel content between 70 and 95 percent by weight of the copolymer as determined in toluene at 25° C.

8. A composition of matter comprising from 55 to 70 percent by weight of polystyrene and from 45 to 30 percent by weight of a copolymer containing in chemically combined form from 42 to 50 percent by weight of butadiene-1,3 and from 58 to 50 percent by weight of vinyltoluene, said butadiene copolymer having a gel content between 70 and 95 percent by weight of the copolymer as determined in toluene at 25° C.

References Cited in the file of this patent

UNITED STATES PATENTS

| | | |
|---|---|---|
| 2,498,712 | Ryden | Feb. 28, 1950 |
| 2,574,439 | Seymour | Nov. 6, 1951 |
| 2,578,518 | Ditz et al. | Dec. 11, 1951 |
| 2,614,093 | Wheelock | Oct. 14, 1952 |
| 2,797,203 | Barber | June 25, 1957 |
| 2,810,707 | Nagle | Oct. 22, 1957 |
| 2,882,258 | Briggs | Apr. 14, 1959 |